United States Patent
Chandrashekar et al.

(10) Patent No.: US 10,348,892 B2
(45) Date of Patent: Jul. 9, 2019

(54) SCHEDULING TELEPHONE CALLS

(71) Applicant: International Business Machines Corporation, Armonk, NY (US)

(72) Inventors: Charan Acharya Chandrashekar, Siddapur (IN); Santosh Hegde, Bangalore (IN); Mahadev Khapali, Bangalore (IN); Shashank V. Vagarali, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/182,960

(22) Filed: Jun. 15, 2016

(65) Prior Publication Data

US 2017/0366665 A1 Dec. 21, 2017

(51) Int. Cl.
*H04M 3/432* (2006.01)
*H04M 1/663* (2006.01)
*H04M 1/725* (2006.01)
*H04M 3/436* (2006.01)

(52) U.S. Cl.
CPC .......... *H04M 3/432* (2013.01); *H04M 1/663* (2013.01); *H04M 1/72569* (2013.01); *H04M 3/436* (2013.01); *H04M 2203/556* (2013.01); *H04M 2242/28* (2013.01); *H04M 2250/12* (2013.01)

(58) Field of Classification Search
CPC .......... H04W 4/02; H04W 4/00; H04W 4/12; H04W 8/18; H04W 68/10; H04M 3/432; H04M 3/436; H04M 1/72569; H04M 1/663; H04M 2250/12; H04M 2203/556; H04M 2242/28

USPC ...... 455/414.1, 414.2, 414.3, 459, 445, 413, 455/412.2, 456.1

See application file for complete search history.

(56) References Cited

U.S. PATENT DOCUMENTS

| | | | |
|---|---|---|---|
| 7,076,043 B2 | 7/2006 | Curbow et al. | |
| 7,330,721 B2 | 2/2008 | Bhatia et al. | |
| 8,189,759 B2 | 5/2012 | Couse et al. | |
| 8,503,994 B1 | 8/2013 | Sanjeev | |
| 8,527,263 B2 | 9/2013 | Bradley et al. | |
| 8,971,934 B2 | 3/2015 | Baca et al. | |
| 2002/0116461 A1 | 8/2002 | Diacakis et al. | |
| 2005/0003800 A1* | 1/2005 | Yugami | H04M 1/72552 455/413 |
| 2005/0151628 A1* | 7/2005 | Becker | B60R 25/04 340/426.1 |

(Continued)

FOREIGN PATENT DOCUMENTS

EP 1255414 B1 8/2006

OTHER PUBLICATIONS

"Vision 80/20 for Microsoft Lync", Enghouse Interactive, Product Sheet, 4 pages, retrieved on Apr. 11, 2016, © 2012 Enghouse Systems, <http://enghouseinteractive.dk/wp-content/uploads/2013/02/Enghouse_Vision_8020_for_Lync_2013_02_12-_ENG.pdf>.

*Primary Examiner* — Kamran Afshar
*Assistant Examiner* — Farid Seyedvosoghi
(74) *Attorney, Agent, or Firm* — Edward J. Wixted, III

(57) ABSTRACT

A computer-implemented method includes identifying a mobile phone. The method includes identifying one or more input devices. The one or more input devices are associated with the mobile phone. The method includes collecting behavior information from the input devices. The method includes applying machine learning to the behavior information to yield a schedule.

7 Claims, 3 Drawing Sheets

(56) References Cited

U.S. PATENT DOCUMENTS

| | | | |
|---|---|---|---|
| 2006/0156209 A1* | 7/2006 | Matsuura | G06Q 10/10 |
| | | | 714/798 |
| 2009/0042540 A1* | 2/2009 | Bodnar | G06Q 30/02 |
| | | | 455/410 |
| 2010/0215157 A1 | 8/2010 | Narayan et al. | |
| 2010/0273447 A1* | 10/2010 | Mann | H04M 1/72519 |
| | | | 455/405 |
| 2011/0319094 A1* | 12/2011 | Usui | G01S 5/0027 |
| | | | 455/456.1 |
| 2012/0190326 A1* | 7/2012 | Mizusawa | H04L 12/1421 |
| | | | 455/406 |
| 2013/0217364 A1 | 8/2013 | Varoglu et al. | |
| 2015/0181397 A1* | 6/2015 | Dudai | H04M 3/42102 |
| | | | 455/405 |
| 2017/0063606 A1* | 3/2017 | Babu | H04L 41/0686 |

* cited by examiner

SCHEDULING TELEPHONE CALLS

BACKGROUND

The present invention relates generally to the field of user time management, and more particularly to optimally scheduling phone calls.

A call is a real time voice connection over a network between a called party and a calling party. A call may include audio and video signals by users at different locations, for communication purposes, between the users in real-time. Various devices exist to facilitate participating in calls, being a called party, and being a calling party. A call may require a mutual agreement by both parties to participate. That is, the called party may be required to accept the calling party's request to initiate a call. If the called party does not accept the calling party's request to initiate a call, the called party may not be sure whether to try calling again or when to try calling again.

SUMMARY

A computer-implemented method includes identifying a mobile phone. The method includes identifying one or more input devices. The one or more input devices are associated with the mobile phone. The method includes collecting behavior information from the input devices. The method includes applying machine learning to the behavior information to yield a schedule. A corresponding computer program product and computer system are also disclosed.

In some embodiments, the method further includes determining an optimal contact time based on the schedule. A corresponding computer program product and computer system are also disclosed.

In some embodiments, the method further includes receiving a missed call notification for a call directed to the mobile phone from a source device. The method includes sending the optimal contact time to the source device. A corresponding computer program product and computer system are also disclosed.

DETAILED DESCRIPTION

Figure 1:
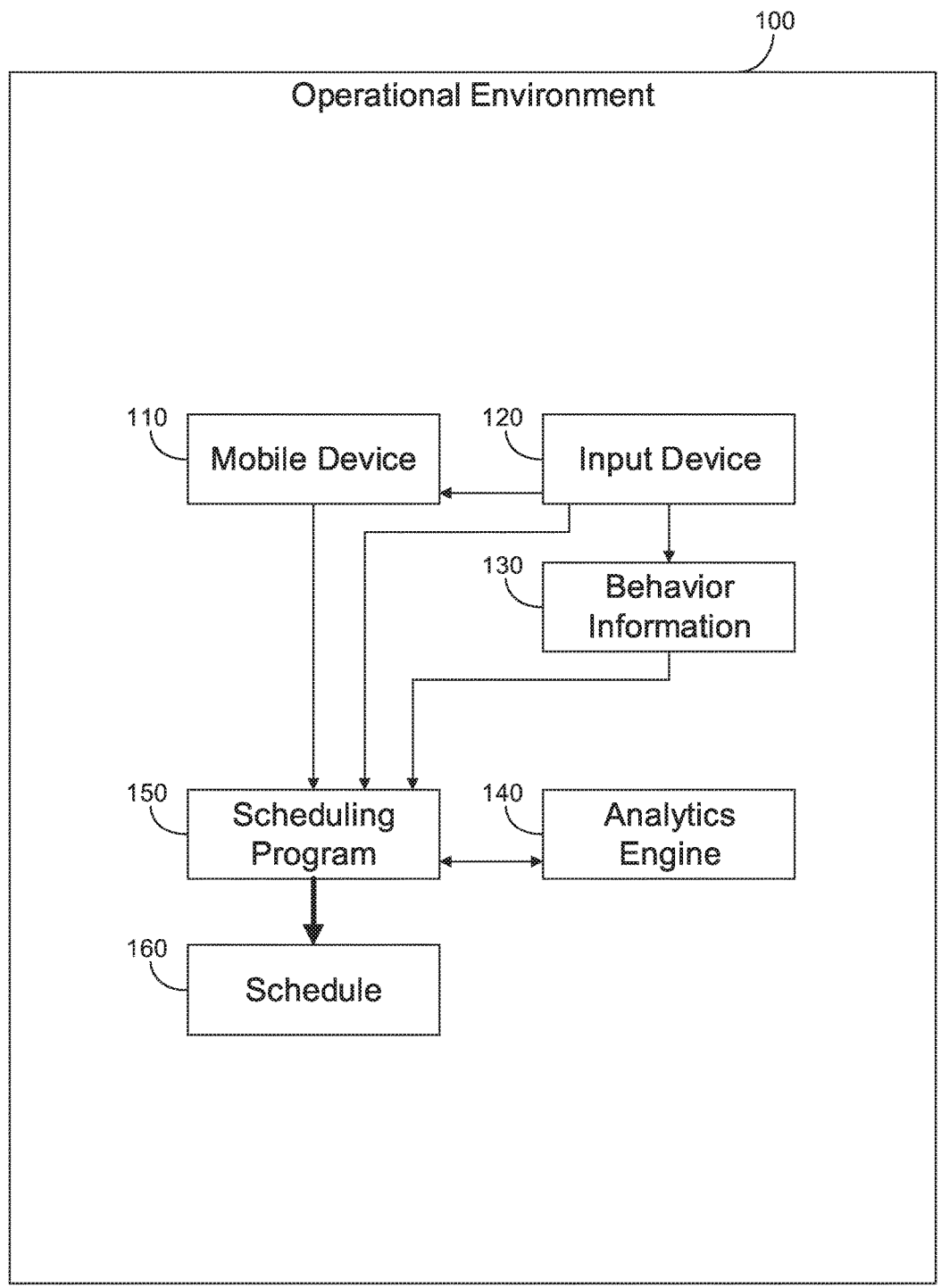
FIG. 1 is a block diagram of an operational environment suitable for operation of a scheduling program, in accordance with at least one embodiment of the present invention.

Referring now to the invention in more detail, FIG. 1 is a block diagram displaying an exemplary operational environment suitable for operation of at least one embodiment of the invention. An operational environment 100 includes a mobile device 110, an input device 120, behavior information 130, a scheduling program 150, an analytics engine 140, and a schedule 160, all in mutual communication and interconnected via the operational environment 100. The operational environment 100 may be a cloud-based, virtual, or distributed environment. The operational environment 100 may be a remote environment on defined server hardware. More generally, the operational environment 100 may be any type of environment suitable for access by the scheduling program 150.

The mobile device 110 may be a mobile phone, smart phone, tablet, laptop, personal computer or other computing device capable of receiving calls. Calls may be telephonic or video. The mobile device 110 is capable of receiving call initiation requests from a source device (not illustrated). A call initiation request is a request to begin a call. The source device may be another mobile device that is similar to the mobile device 110 but distinct from the mobile device 110. The source device may be a landline telephone. In general, the source device is any device capable to sending the mobile device 110 a call initiation request and subsequently engaging in a call with the mobile device 110 and/or facilitating a call with the mobile device 110 if the call initiation request is granted. The mobile device 110 is capable of responding to user input to accept the call or to reject the call. In some embodiments a call initiation request from a source device may be ignored. Ignoring may include the mobile device 110 not receiving user input in response to the call initiation request within a certain period of time. In some embodiments, an ignored call initiation request and a rejected call initiation request are considered a missed call. A missed call may generate a missed call notification which may be received by the scheduling program 150 via the operational environment 100.

The input device 120 is associated with the mobile device 110. In some embodiments, the mobile device 110 may be associated with multiple input devices similar to the input device 120. The input device 120 is a device capable of receiving user input. The input device 120 may be a computing device. The input device 120 may be a device selected from the group consisting of: an accelerometer, a gyroscope, a barometer, a camera, an intrusion detection system, a time server, a microphone, a light sensor, a heartrate monitor, and a global positioning system receiver.

The behavior information 130 may be the specific items of user input received by the input device 120. For example, in embodiments where the input device is a heartrate monitor, the behavior information 130 may include a user's heartrate for every minute over an extended period of time. In some embodiments, the input device 120 stores the behavior information 130. The scheduling program 150 may compare the behavior information 130 to known, pre-determined patterns. For example, a combination of behavior information items from an accelerometer, gyroscope, barometer, light sensor, heartrate monitor, and global positioning system receiver may be consist with the mobile device 110 being carried by a user who is traveling on a bicycle in New York City.

The scheduling program 150 may be a dedicated client program. The scheduling program 150 may be a function integrated within another program, such as a scheduling program management system. The scheduling program 150 is capable of identifying the mobile device 110, identifying the input device 120, and collecting the behavior information 130 from the input device 120. The scheduling program 150 may apply machine learning to the behavior information 130 via the analytics engine 140. The analytics engine 140 may be IBM® Watson®. In some embodiments, the analytics engine 140 may provide pattern matching capabilities. In some embodiments, the analytics engine 140 may provide unobserved feature discovery capabilities. In some embodiments, the analytics engine 140 may include machine learning models. In some embodiments, the analytics engine 140 may include natural language processing models.

The scheduling program 150 may apply machine learning via the analytics engine 140 to the behavior information 130 to generate the schedule 160. The schedule 160 may be considered a prediction of what activities a user associated with the mobile device 110 will partake in, based on patterns detected by the analytics engine 140. For example, if the behavior information 130 includes that an input device, such as the input device 120, detects an elevated heartrate every weekday that lasts from approximately 8 am to 9 am, the schedule 160 may include that the user associated with the mobile device 110 exercises every weekday from 8 am to 9 am. In another example, if the behavior information 130 includes that an input device, such as the input device 120, detects a change in location every weekday from 9 am to 9:30 am, the schedule 160 may include that the user associated with the mobile device 110 commutes to work every weekday from 9 am to 9:30 am.

Figure 2:
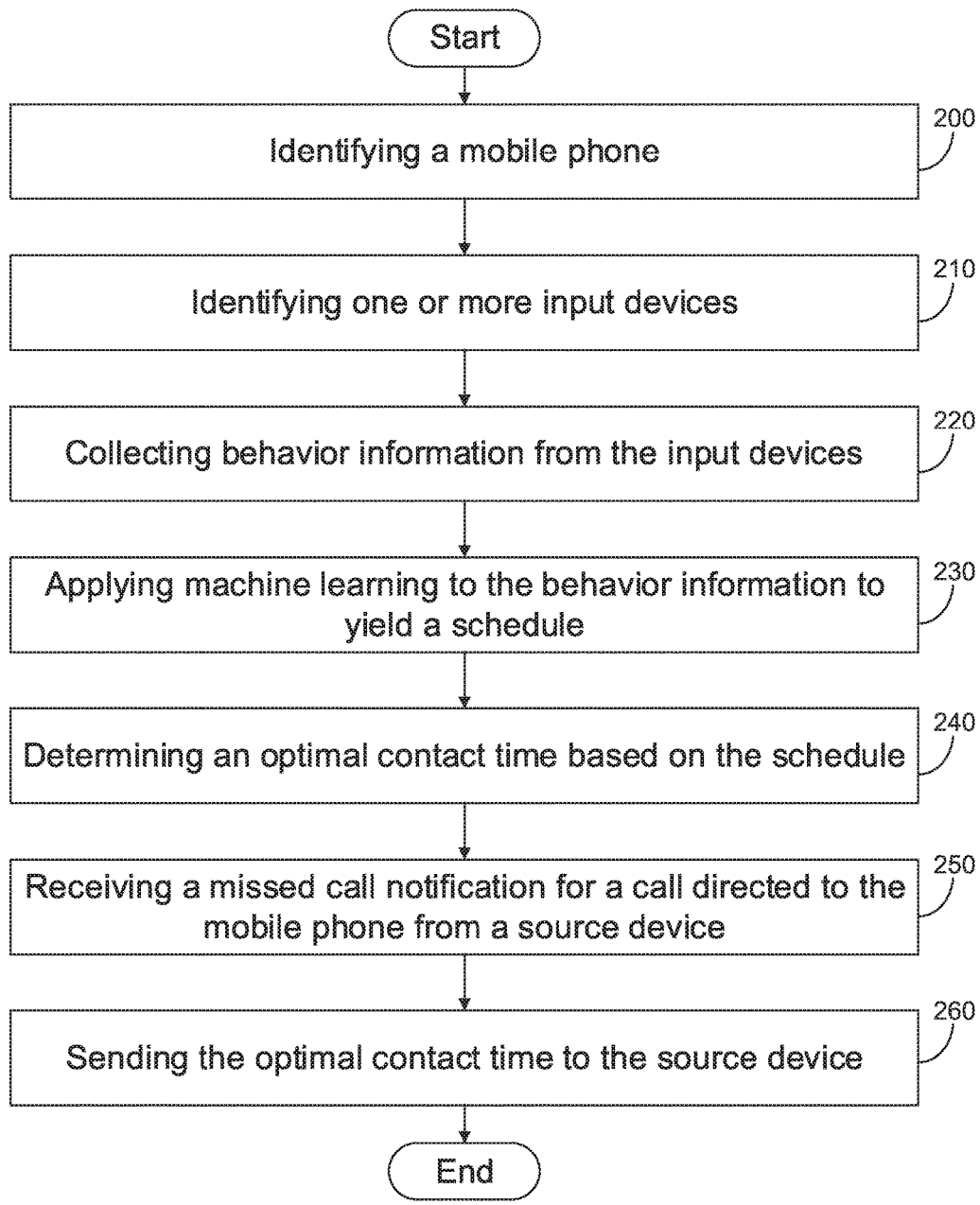
FIG. 2 is a flowchart depicting operational steps for a scheduling, in accordance with at least one embodiment of the present invention.

FIG. 2 is a flowchart depicting the operational steps of the scheduling program 150, executing within the operational environment 100 of FIG. 1, in accordance with an embodiment of the present invention.

At step 200, the scheduling program 150 identifies a mobile phone, such as the mobile device 110. Identifying may include a user explicitly calling the scheduling program 150 from a command line interface using a reference to the mobile device 110 as an argument. Alternatively, identifying may include automated calls to the scheduling program 150, for example, from an integrated development environment or as part of a scheduling management system.

At step 210, the scheduling program 150 identifies an input device, such as the input device 120. The scheduling program 150 may identify multiple input devices, such as and similar to the input device 120. Each input device identified at step 210 is associated with the mobile device 110.

At step 220, the scheduling program 150 collects the behavior information 130 from the input device 120. Collecting may include a user explicitly calling the scheduling program 150 from a command line interface using a reference to the behavior information 130 as an argument. The scheduling program 150 may collect the behavior information 130 continuously, regularly, and/or at pre-determined intervals. The scheduling program 150 may organize the behavior information 130. Organizing may include a segment scan or an index scan. Organizing may include sorting the behavior information 130 based on timestamp data. Organizing may include sorting the behavior information 130 based on location data.

At step 230, the scheduling program 150 applies machine learning, via the analytics engine 140, to yield the schedule 160.

At step 240, the scheduling program 150 determines an optimal contact time based on the schedule 160. The scheduling program 150 may determine the optimal contact time via an analytics engine, such as the analytics engine 140. The optimal contact time may be understood as a specific time or range of time that has been identified by the scheduling program 150, via the analytics engine 140, as when a user associated with the mobile device 110 is most likely to accept a call initiation request. For example, the scheduling program 150 may determine that, based on the schedule 160 and the behavior information 130, that a user associated with the mobile device 110 listens to music every day from 4 pm to 6 pm. In such an embodiment, the scheduling program 150 may determine that 4 pm to 6 pm is the optimal contact time. The behavior information 130 may include a call answering history associated with the mobile device 110. For example, the behavior information 130 may include a history log of when the mobile device 110 has received call initiation requests, when the mobile device 110 has accepted the call initiation requests, when the mobile device 110 has rejected the call initiation requests, and what other behavior information 130 items were collected from input devices, such as the input device 120, at and/or around the time the various call initiation requests were accepted or rejected. For example, the scheduling program 150 may update the schedule 160 to include that a call initiation request was more likely to be ignored if the mobile device 110's location is changing in the morning, than if the mobile device 110's location is changing at night. In some embodiments, the optimal contact time may be a specific time and date or a specific date and time range. For example, that the optimal contact time is Monday, May $9^{th}$ at 5:45 pm or Monday, May $9^{th}$ from 5:40 pm to 6 pm. In some embodiments, the optimal contact time may be a general weekday and a specific time or a general weekday and a time range. For example, that the optimal contact time is Mondays at 4:30 pm or Mondays from 4 to 5 pm. The optimal contact time may be multiple times or multiple time ranges. The scheduling program 150 may determine multiple times or multiple time ranges at which the mobile device 110 is likely to answer a call initiation request. In such an embodiment, the optimal contact time may be the time or time range that will occur the soonest.

At step 250, the scheduling program 150 receives a missed call notification for a call directed to the mobile device 110 from a source device. The missed call notification may be an indication that the mobile device 110 received a call initiation request and ignored the call initiation request (the mobile device 110 did not receive user input to accept or reject the call) and/or that the call initiation request was rejected (the mobile device 110 receiving user input selecting to reject the call). The source device may be a telephone service platform, a teleconferencing service platform, a video call service platform, a landline phone, a cellular phone, a device similar to, but distinct from the mobile device 110, or any computing device capable of generating a call initiation request and subsequently participating in a call with the mobile device 110.

At step 260, the scheduling program 150 sends the optimal contact time determined at step 240 to the source device. Sending may include generating a notification or instructions enabling the source device to display a notification displaying the optimal contact time. The scheduling program 150 may send the optimal contact time to the source device via an email, voice messaging system, as a voice mailbox message, or via a text messaging system. The scheduling program 150 may send the optimal contact time via an operational environment, such as the operational environment 100. Sending the optimal contact time to the source device may include sending information about why the optimal contact time is the optimal contact time and/or why the user associated with mobile device 110 has rejected the call initiation request. For example, the optimal contact time may include instructions to display a message such as "the user cannot answer the phone as she is driving. The best time to call her back is 4 pm."

In some embodiments, the scheduling program 150 may continuously and dynamically monitor the behavior information 130. In such an embodiment, the scheduling program 150 may update the schedule 160 and may determine a new optimal contact time. In such an embodiment, if the scheduling program 150 has sent an optimal contact time to a source device but between the time of the missed call and the time of the optimal contact time the optimal contact time changes the scheduling program 150 may send an update to the source device, indicating to said source device that the optimal contact time has changed.

For example, the scheduling program 150 may receive a missed call notification at 4 pm indicating that a source device attempted to call the mobile device 110, but the call initiation request was ignored. At the time the missed call notification was received, scheduling program 150 may have determined that the optimal contact time is 6 pm. At or around 4 pm, the scheduling program 150 sent the source device a message indicating that the optimal contact time is 6 pm. However, at around 5:45 pm the behavior information 130 receives information from the input device 120 indicating that the mobile device 110 is stuck in traffic. In such an embodiment, the scheduling program 150 may determine a new optimal contact time and send the source device the new optimal contact time. The scheduling program 150 may continuously and dynamically monitor the behavior information 130 to update the optimal call time via the analytics engine 140.

Figure 3:
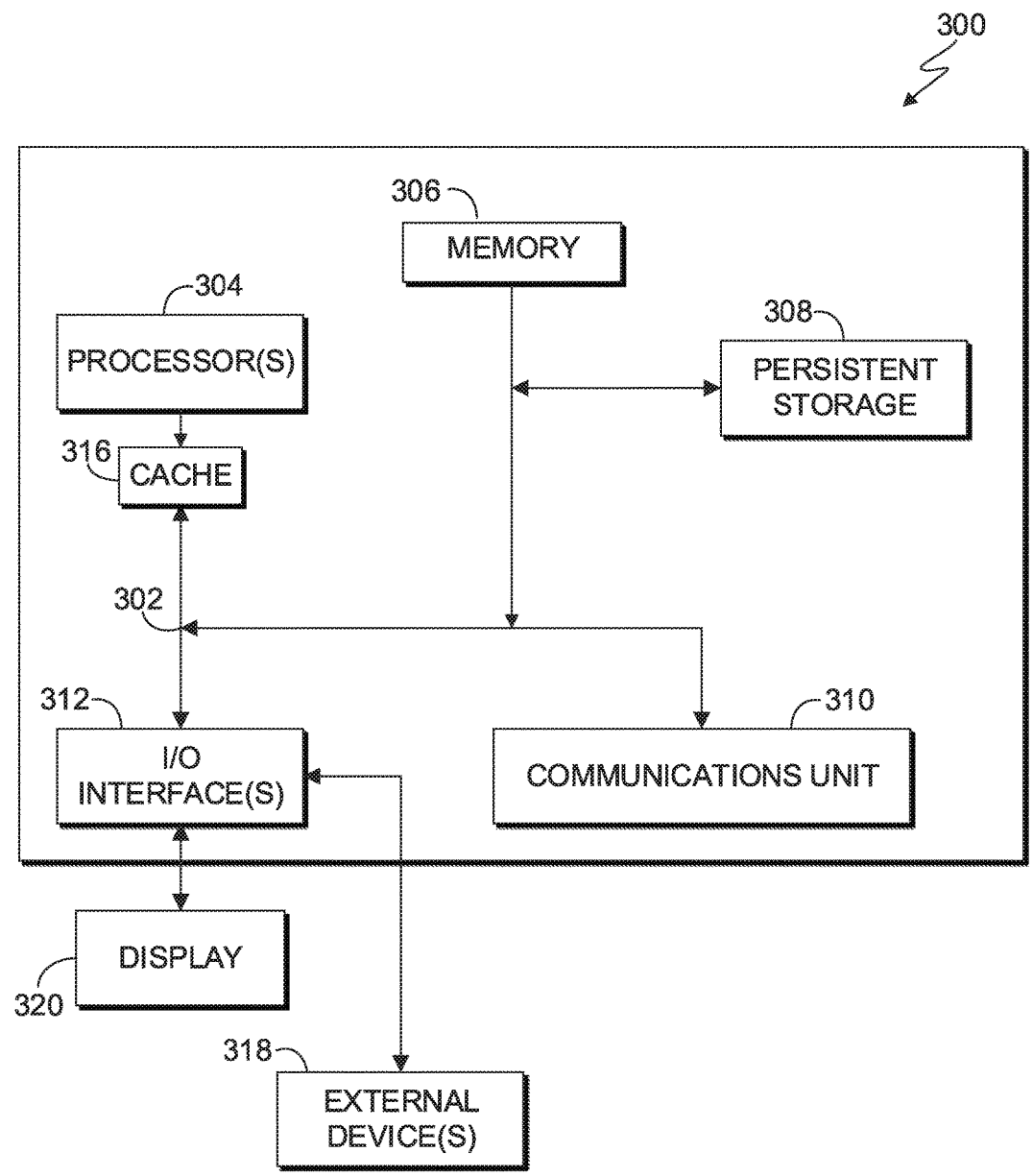
FIG. 3 is a block diagram of components of an operational apparatus suitable for executing a scheduling program, in accordance with at least one embodiment of the present invention.

FIG. 3 is a block diagram depicting components of a computer 300 suitable for executing the scheduling program 150. FIG. 3 displays the computer 300, the one or more processor(s) 304 (including one or more computer processors), the communications fabric 302, the memory 306, the RAM 316, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g., microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the scheduling program 150 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. The scheduling program 150 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying a mobile phone;
identifying one or more input devices, said one or more input devices being associated with said mobile phone;
collecting behavior information from said input devices wherein the information is continuously monitored in real time;
applying machine learning to said behavior information to predict an activity performed by a user of said mobile phone, wherein said predicated activity is based upon a history of behavioral patterns;
identifying time periods associated with the predicted activity performed by a user;
rejecting a call to said mobile phone from a source device based, at least in part, on the predicted activity and the respectively identified time periods associated with the predicted activity without input from the user;
determining an optimal contact time based on said schedule;
updating the schedule to determine a new optimal contact time, wherein the new optimal contact time is based upon receiving the behavioral information indicating the optimal contact time has changed; and
automatically sending the new optimal contact time and said activity to said source device.

2. The computer-implemented method of claim 1, wherein said one or more input devices comprise at least one device selected from the group consisting of:
a camera; and
an intrusion detection system.

3. The computer-implemented method of claim 1, wherein:
   said input devices comprise a heartrate monitor; and
   the predicted activity performed by the user comprise exercising.

4. A computer program product comprising:
   one or more computer readable storage media and program instructions stored on said one or more computer readable storage media, said program instructions comprising instructions to:
   identify a mobile phone;
   identify one or more input devices, said one or more input devices being associated with said mobile phone;
   collect behavior information from said input devices wherein the information is continuously monitored in real time;
   apply machine learning to said behavior information to predict an activity performed by a user of said mobile phone, wherein said predicated activity is based upon a history of behavioral patterns;
   identify time periods associated with the predicted activity performed by a user;
   reject a call to said mobile phone from a source device based, at least in part, on the predicted activity and the respectively identified time periods associated with the predicted activity without input from the user;
   determine an optimal contact time based on said schedule;
   update the schedule to determine a new optimal contact time, wherein the new optimal contact time is based upon receiving the behavioral information indicating the optimal contact time has changed; and
   automatically send the new optimal contact time and said activity to said source device.

5. The computer program product of claim 4, wherein said one or more input devices comprise at least one device selected from the group consisting of:
   a camera; and
   an intrusion detection system.

6. A computer system comprising:
   one or more computer processors;
   one or more computer readable storage media;
   computer program instructions; and
   said computer program instructions being stored on said computer readable storage media for execution by at least one of said one or more processors, said computer program instructions comprising instructions to:
   identify a mobile phone;
   identify one or more input devices, said one or more input devices being associated with said mobile phone;
   collect behavior information from said input devices wherein the information is continuously monitored in real time;
   apply machine learning to said behavior information to predict an activity performed by a user of said mobile phone, wherein said predicated activity is based upon a history of behavioral patterns;
   identify time periods associated with the predicted activity performed by a user;
   reject a call to said mobile phone from a source device based, at least in part, on the predicted activity and the respectively identified time periods associated with the predicted activity without input from the user;
   determine an optimal contact time based on said schedule;
   update the schedule to determine a new optimal contact time, wherein the new optimal contact time is based upon receiving the behavioral information indicating the optimal contact time has changed; and
   automatically send the new optimal contact time and said activity to said source device.

7. The computer system of claim 6, wherein said one or more input devices comprise at least one device selected from the group consisting of:
   a camera; and
   an intrusion detection system.

\* \* \* \* \*